3,315,562

BATHYTHERMOGRAPH DATA RECORDS PRODUCTION

Charles D. Sauer, Ernest H. Bowler, and Arthur B. Forward, Ottawa, Ontario, Canada, assignors to Canadian Patents and Development Limited, Ottawa, Ontario, Canada, a corporation of Canada Filed Feb. 12, 1965, Ser. No. 432,269
14 Claims. (Cl. 88—24)

This invention relates to the production of records containing bathythermograph data.

The basic bathythermograph (BT) record constitutes a curve representing water temperature versus water depth and it is usually produced on a semi-transparent glass slide, one and one-quarter by one inch in size. The glass slide is coated with a thin metallic film or carbon film and the trace is scratched on it by a stylus. This curve, when associated with a calibration grid of the particular bathythermograph from which it was derived, yields a graphical record of sea-water temperature versus depth. In accordance with usual practice, the BT record slide with the superimposed grid is enlarged and printed photographically on a three inch by five inch card for reading and storage purposes. The identification data associated with each particular BT recording is manually inscribed on the card. A number of such cards may be made, one being used for a master permanent record file and the others for interested agencies. The recorded temperature versus depth data, when required for numerical evaluation, are obtained from the cards by manual methods.

It has long been recognized that this manner of processing and utilizing BT data is awkward and time-consuming. Required BT information cannot be extracted from the records in a rapid and efficient manner. Serious delays thus occur in providing information as required by oceanographers, research groups and organizations, defence services and related fields of industry, such as the fishing industry.

It is an object of this invention to provide a method and apparatus for producing bathythermographic data-containing record cards adapted for use in machines employed in indexing, classification and digitization systems.

A more specific object is to provide a method and apparatus for producing a record card having mounted in an aperture thereof, a film displaying bathythermograph data.

Another object is to provide a method and apparatus for readily superimposing a calibration grid on a bathythermograph data-containing slide in accurately adjustable associated relation therewith, and reproducing the image of said slide and grid on the film surface of an aperture record card.

Aperture frame cards (such as, for instance, disclosed in United States Patent 2,512,106) are widely used in indexing and classification systems. Such a card is provided with an aperture in which is mounted data. The aperture of the card contains a photographic film surface such as a microfilm negative or positive film surface for storage of graphical records, drawings, and the like. Alpha-numeric data is key-punched on the card in conventional manner. A "diazo" duplicate of the card is suitable for use in standard card data handling equipment, including key punches, duplicators, sorters, and the like. Standard equipment for automatically reproducing first generation aperture cards to yield diazo duplicates is available. The present invention is concerned with the provision of an aperture frame card containing BT data, the microfilm portion thereof being a reproduction of a BT slide with superimposed grid.

Machines are available for photographing directly a desired record onto the microfilm portion of an aperture frame card. Such a machine performs automatically, the complete operation of card feeding, photographing, developing, fixing, washing, and drying. It normally photographs the desired record at a 16–1 reduction. It does not have readily available means for photographing a standard BT record slide at a required reduction of 0.7 so that the resulting card can be used in standard machines to produce cards of required size say, three by five inches. The invention thus contemplates the provision of means for obtaining a desired reduction from the original in the photographic reproduction of a BT slide.

There is another serious problem incidental to the reproduction of the BT data. As previously indicated, it is, of course, necessary to superimpose a calibration grid on the curve of the slide in order to give the required readings. This grid must be very carefully positioned with respect to the slide if the readings are to be accurate. The invention further contemplates the provision of means for accurately positioning the slide and grid members with respect to each other along the $x$ and $y$ axes thereof, as well as means for rotatively adjusting the position of one of such members relatively to the other. To this end, means are provided for clearly viewing the relative positions of the members. Means are also provided for locking the members in accurately positioned relation to each other, for subsequent reproduction by the mentioned photographic procedure.

The photographic procedure is of direct shadow-graph type for good resolution of record and low power illumination requirements.

The invention will be further described with reference to the accompanying drawings, in which:

FIGURE 1 is a plan view of a bathythermograph data-containing record card produced in accordance with the invention, FIGURE 2 is a plan view of a conventional bathythermograph slide, FIGURE 3 is a plan view of a conventional bathythermograph grid, FIGURE 4 is a front elevation of a machine for photographically reproducing data on the microfilm portion of an aperture frame card, modified in accordance with the invention, FIGURE 5 is a sectional side elevation of the machine shown in FIGURE 4, FIGURE 6 is a plan view of a BT slide holder, FIGURE 7 is a partial sectional side elevation of the slide holder shown in FIGURE 6, FIGURE 8 is a section on line 8—8 of FIGURE 6, FIGURE 9 is a plan view of a calibration grid holder, FIGURE 10 is a sectional side elevation on line 10—10 of FIGURE 9, FIGURE 11 is a perspective view of a portion of a guide track for the slide holder, FIGURE 12 is a plan view of a lamp tray, and FIGURE 13 is a side elevation, partly in section, on line 13—13 of FIGURE 12.

Referring to FIGURE 1, 10 is an aperture frame card of conventional form having a microfilm negative or positive film surface 11 mounted in the aperture thereof and punching 12.

Figures 1, 2, 3:
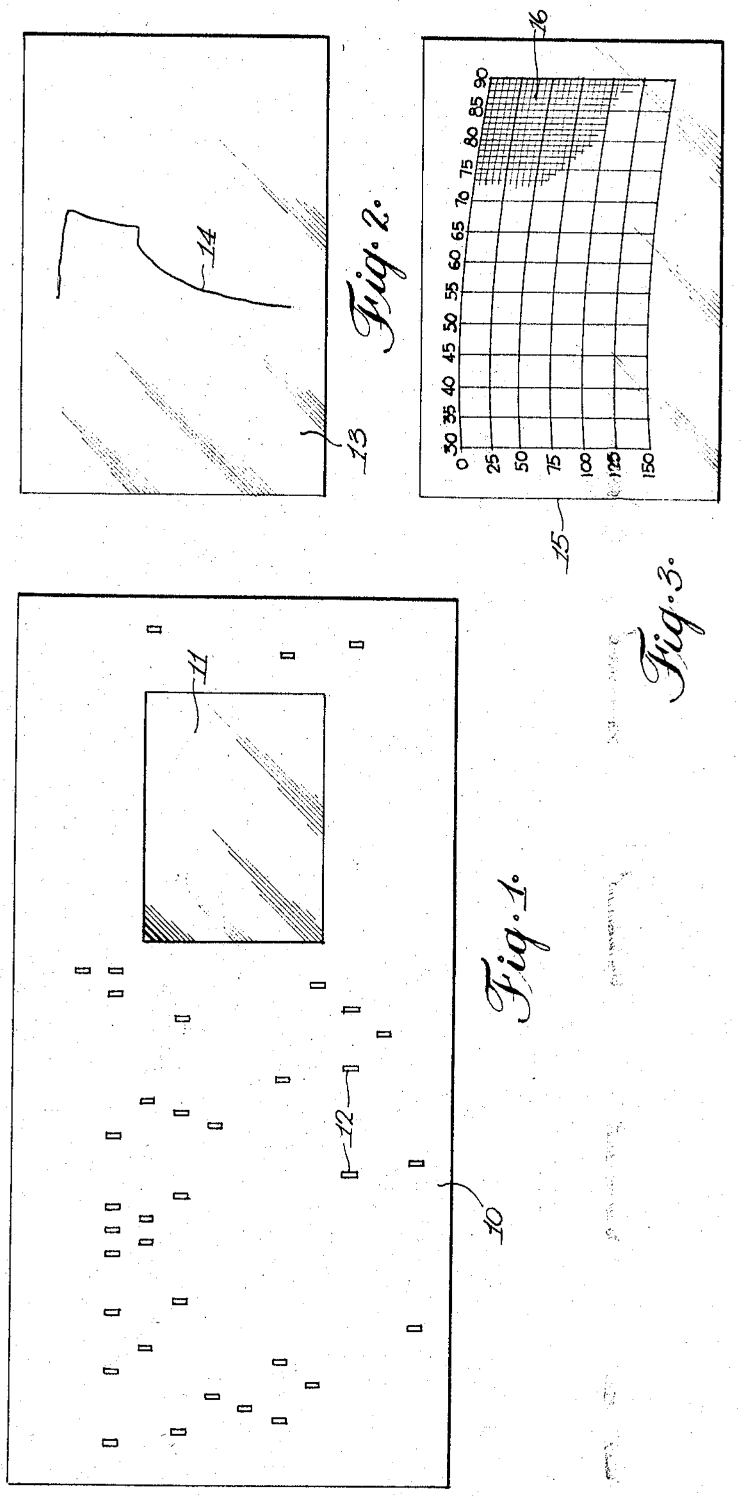
FIGURE 2 illustrates a translucent glass plate comprising a BT slide 13 having a trace 14 thereon.
FIGURE 3 shows a transparent glass plate 15 having a calibration grid 16 thereon.
Figure 4:
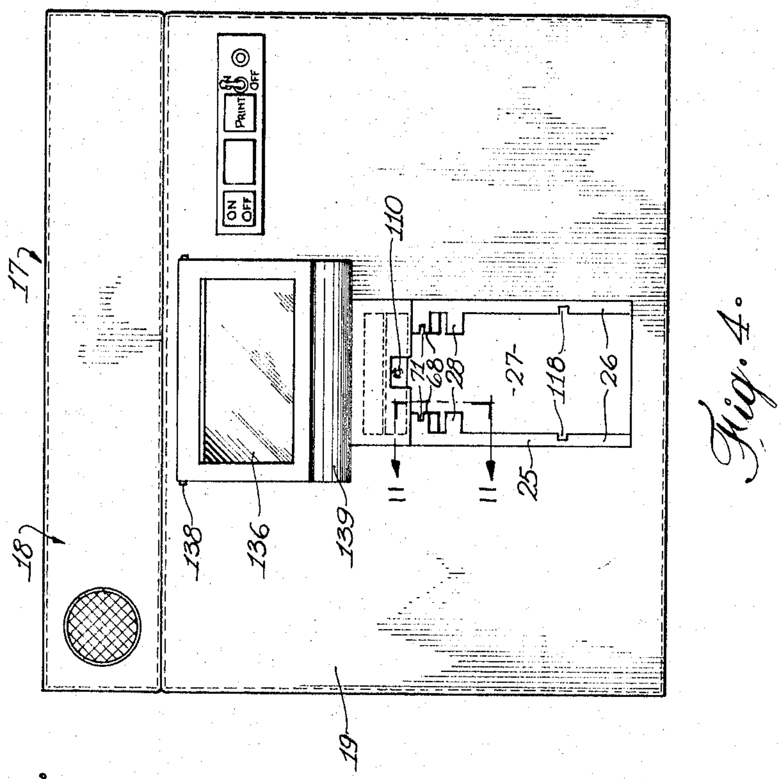
Figure 5:
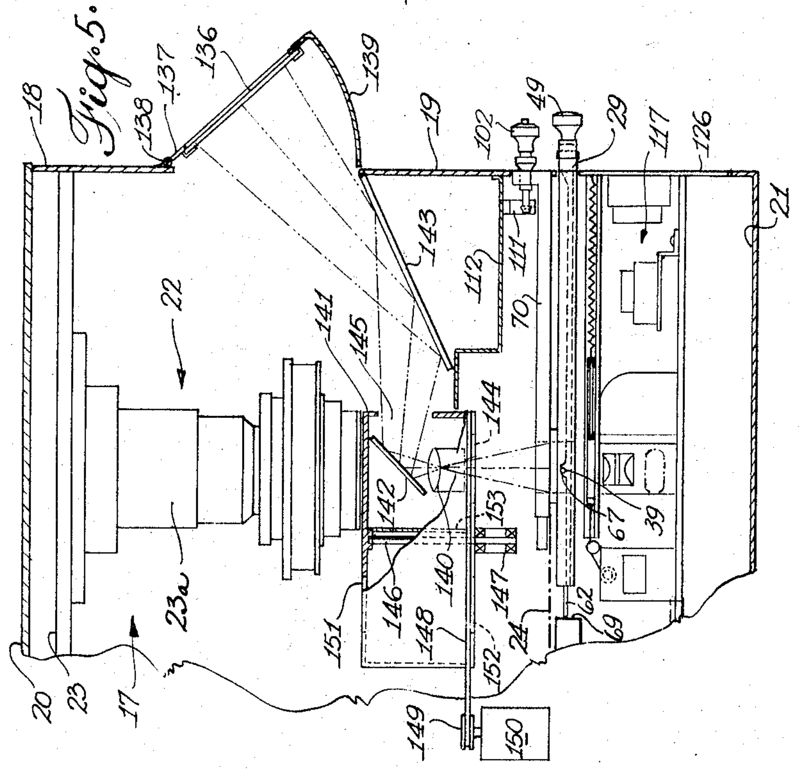

Referring to FIGURES 4 and 5, there is illustrated therein a machine 17 for the direct photographic transfer of records to the microfilm portion of an aperture frame card. The machine is of basically conventional structure and the equipment for effecting the various automatically photographic operations thereof will not be described. The machine is housed within a casing 18 having a forward wall 19, top wall 20, and bottom wall 21. Within the casing is mounted the usual lens system 22 but the distance between the image plane, indicated at 23, and the object plane, indicated at 24, has been decreased by removal of a mirror arrangement previously mounted directly below the lens, and by an extension tube 23*a* incorporated in the lens system.

Mounted in the casing is a housing 25 having side walls 26 and a front opening 27 located in the forward wall 19 of the casing.

Figure 6:
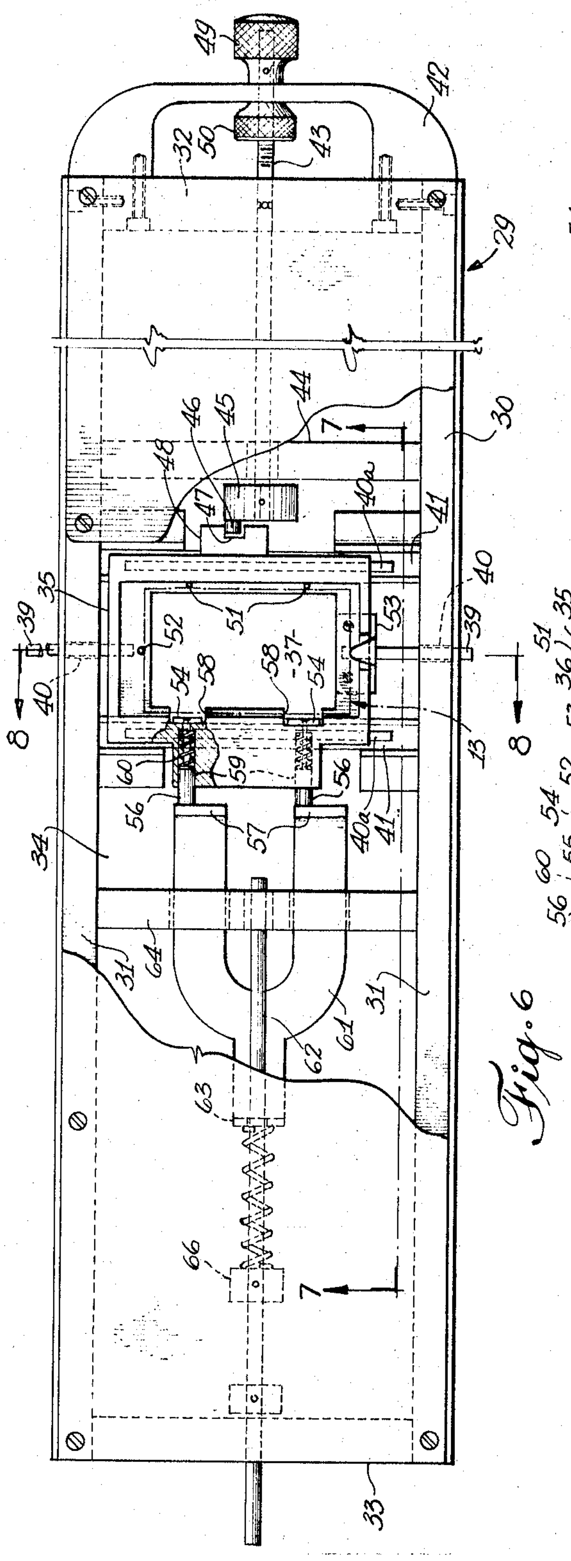
Figure 8:
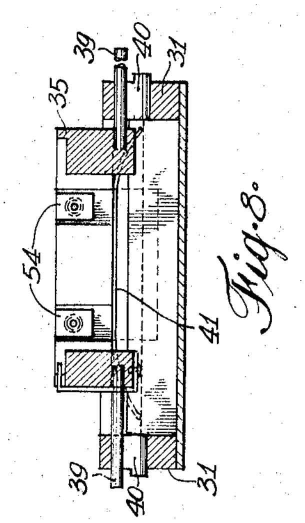
Figure 7:
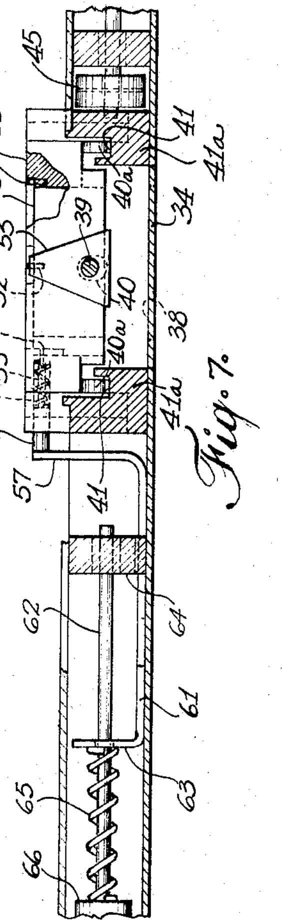

Slidably mounted on guide tracks 28 fixed to the housing side walls 26 is a slide holder 29 comprising a rectangular frame 30 having side frame members 31, front transverse member 32, rear transverse member 33, and base plate 34 (FIGURES 6, 7 and 8). A handle 42 is fixed to the front member 32.

A slide-receiving frame 35 has a recessed top surface 36 upon which is arranged to be seated the peripheral portion of a slide 13, and a central opening 37 which overlies an opening 38 in base plate 34 and which the slide 13 overlies. The frame 35 is mounted for limited perpendicular movement with respect to the holder 29 by means of a pair of pins 39 each extending through a slot 40 in a respective frame member 31. Flat springs 40*a* are positioned in slots 41 between frame 35 and cross members 41*a* to urge the frame 35 in an upward direction, i.e., in a direction away from base plate 34.

Figures 9, 10, 11:
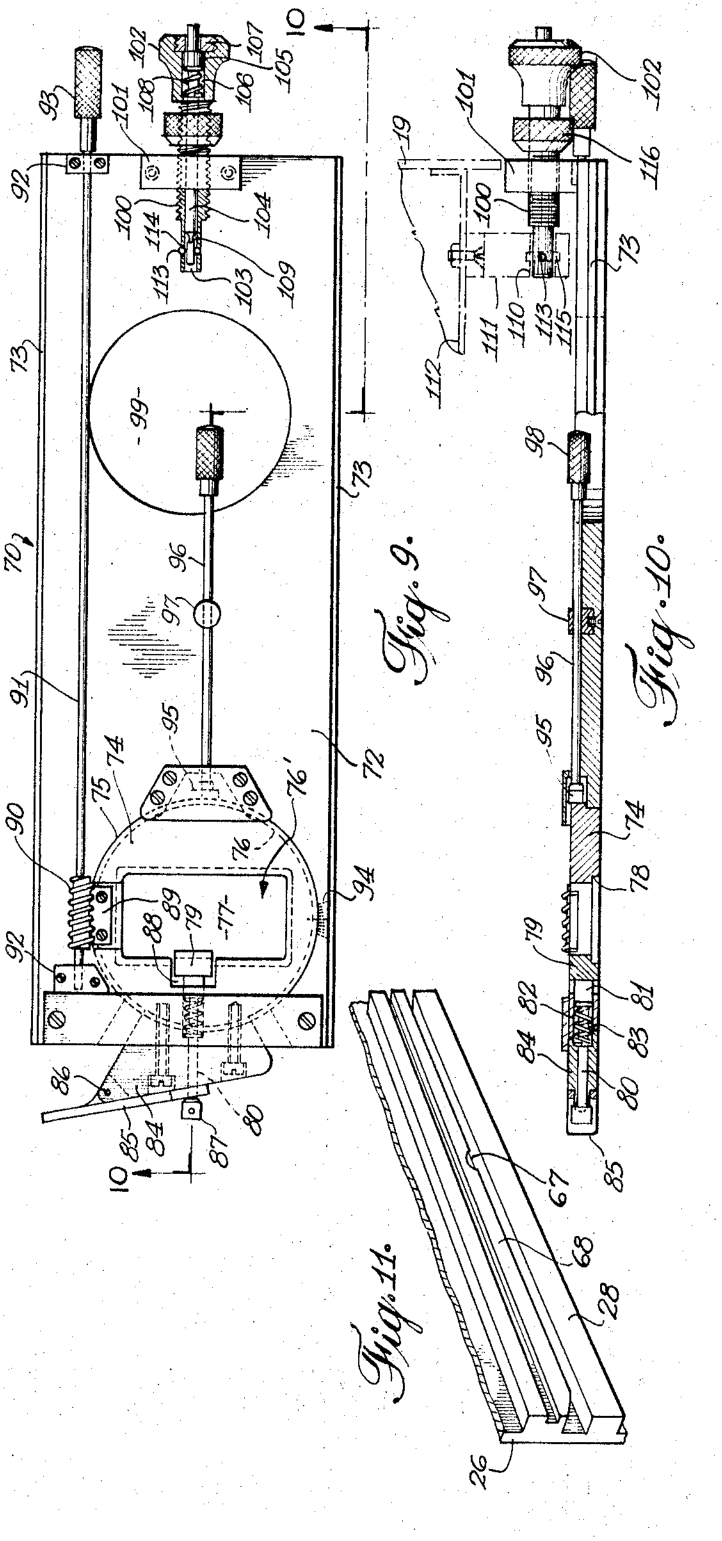
Figures 12, 13:
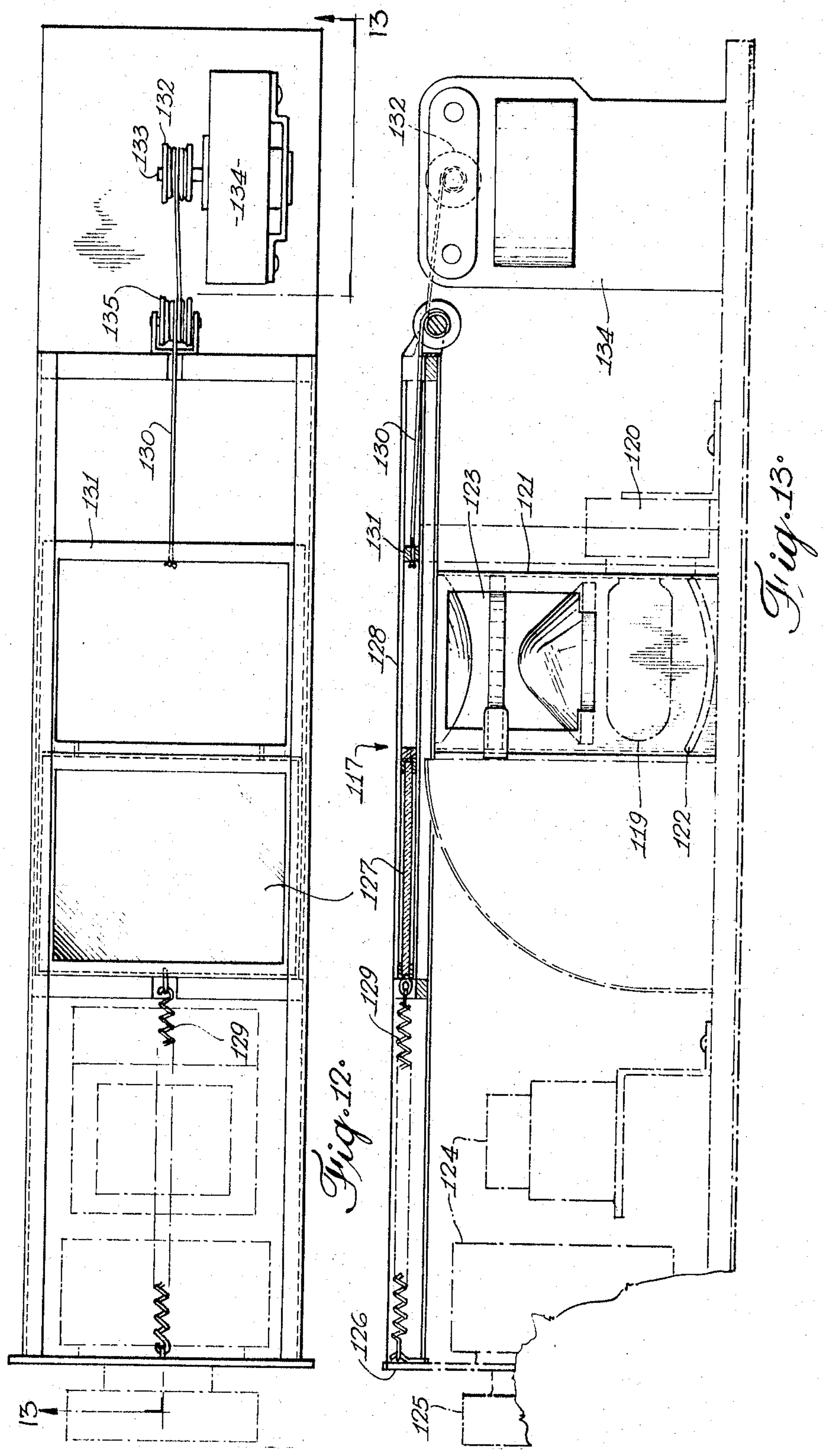

Means for locating holder 29 in correct operative position in the casing comprises a notch 67 in a flange 68 overlying each track 28. The outermost ends of flanges 68 are bevelled as can be seen in FIGURE 11. The spacing between the holder supporting surface of track 28 and the confronting surface of flange 68 is such that when the holder is inserted and pushed inwards the end portions of pins 39 engage the bevelled end surfaces on flanges 68 and the pins 39 are moved down to ride along the under surface of flange 68. The movement of the pins 39 depresses the frame 35 against the action of spring 41. When the pins 39 reach the notches 67, they will enter such notches under the influence of spring 41. This action serves two purposes. When the pins 39 enter notches 67 the operative position of the holder is identified. In addition, the frame 35 is maintained in a depressed position while the holder is being inserted to prevent any sliding surface contact of the slide 13 carried by frame 35 with the grid plate or other adjacent surfaces. It is desirable to have the working surfaces of the slide and the grid plate as close together as possible to keep parallax errors to a minimum. The arrangement described permits the frame 35 with the slide to be depressed, but as the holder becomes positioned, the pins 39 in notches 67 permit the frame 35 to move up and move slide 13 into as close a contact with the grid plate as is feasible.

Means are provided for laterally adjusting the position of the frame 35 in the holder 29; that is, to provide for X adjustment of the slide 13 carried thereby. Such means comprises a shaft 43 journalled in frame member 32 and in a transverse member 44. Mounted on shaft 43 is a crank arm 45 having a crank pin 46 extending into a recess 47 of a cam block 48 fixed to frame 35. The shaft 43 extends through handle 42 and is provided with a turning knob 49. It will be apparent that the frame 35 may be moved laterally in either direction by rotation of the knob. The frame 35 is locked in adjusted position by means of a locknut 50 on the shaft.

The slide 13 is positioned on surface 36 of frame 35 by engagement of its forward longitudinal edge with a pair of posts 51 and engagement of one side edge with a post 52. The opposite side edge is engaged by a flat spring 53 which imposes slight pressure thereon to lightly clamp the slide between spring 53 and post 52. It will be apparent that with the slide holder withdrawn or partly withdrawn from the casing, the slide 13 may be manually loaded on surface 36 or removed therefrom in a convenient manner.

Means are provided for firmly clamping the slide 13 in the frame 35 while permitting sidewise adjustment of the frame and slide. This means may comprise, as shown, a pair of flat pads or plates 54 each carried by a pin 55 on a rod 56 and reciprocally mounted in a bore 59 in frame 35. Each plate 54 is disposed in a recess 58 in the surface 36 and its pin 55 extends through bore 59 in frame 35. Plates 54 are located approximately opposite to posts 51. A spring 60 is mounted on each pin 55 the spring being seated on the adjacent end of rod 56. It will be apparent, therefore, that pressure exerted on plates 54 to move them rearwardly will compress springs 60. The other end of each rod 56 is seated on a shoulder 57 of a bar 61 slidably mounted on base plate 34. The bar 61 is mounted for forward and rearward sliding movement by means of a rod 62 fixed to a shoulder 63 on the bar and slidably supported in members 64 and 33. A spring 65 is mounted on rod 62 and has one end in engagement with shoulder 63 and its other end in engagement with a collar 66. It will be apparent that, in the fully extended condition of spring 65 (as shown in FIGURE 6) bar 61 and plates 54 are in their rearwardmost position and plates 54 will exert little or no pressure upon the edge of a slide 13 positioned in the frame 35. It will further be apparent that pressure exerted on the rearward end of rod 62 will move bar 61 and rods 56 forwardly (spring 65 being thereby compressed). Such movement will cause springs 60 to become compressed thereby causing plates 54 to exert yielding pressure on the edge of slide 13. By suitable choice of tension of spring 60, a yieldable but firm frictional clamping action is applied to slide 13 in the frame 35 between plates 54 and posts 51.

On withdrawal of the holder 29 from the casing to remove or insert a slide therein, the clamping action of plates 54 is released by rearward movement of bar 61 under the influence of spring 65. When holder 29 with a slide 13 therein is placed in the casing, a shoulder 69 engages the end of rod 62 as the ends of pins 39 move into notches 67 to place the slide 13 under firm but yielding clamping pressure.

A grid plate holder 70 is also slidably mounted on tracks 71 in the housing 25 in overlying relation to holder 29. The holder (FIGURES 9 and 10) comprises a rectangular plate 72 having edge portions 73 of lesser thickness for reception in the grooves of tracks 71. A grid plate support 74 comprises a disc rotatably mounted on plate 72 as by means of an annular peripheral flange 75 on the disc and seated on an annular shoulder 76 on the plate and defining a circular opening 76′ in which the disc is located. The disc has a rectangular opening 77 defined by a recessed shoulder 78 located in the under surface of the plate 72. The grid plate 15 is arranged to be seated on the shoulder 78. It is clamped in place thereon by means of a block 79 carried by a rod 80 reciprocally mounted in disc 74. Block 79 has a rearward extension 81 slidably mounted in a recess 82 in disc 74. A spring 83 in the recess urges the block 79 in a forward direction. Rod 80 extends through a lateral extension 84 fixed to disc 74 and through an opening in a lever 85 pivotally mounted at 86 on extension 84. Rod 80 has a lever-engaging lug 87 mounted on the end thereof.

The block 79 is located in a recess 88 in the peripheral wall of opening 77 and it will be observed that, in the "at rest" position of the lever 85, spring 83 urges the block 79 inwardly of the opening, i.e., into clamping engagement with the edge of a grid plate 15 seated on shoulder 78. The grid plate is readily removed from the holder by releasing the clamping pressure of block 79 as a result of outward movement of rod 80 and block 79 by actuation of lever 85.

Means for applying rotative adjustment to the grid plate comprises a rack 89 fixed to disc 74, a worm 90 engaging the rack and fixed to a spindle 91 journalled in bearings 92 on the plate 72. The spindle is provided with a turning knob 93 which projects forwardly of the forward end of the plate. The extent of rotative movement of disc 74 (and grid plate 15) is limited by the extension 84 of disc 74 and the opening at the rearward edge of plate 72 to approximately ±10°. Ordinarily, an extent of ±5° to 10° is sufficient. A scale 94 may be provided on the plate to determine the degree of movement.

Following rotative adjustment of the disc and grid plate, they are locked in adjusted position by means of clamping block 95 which engages a portion of the edge of disc 74 and which is carried on the end of a rod 96 screw-threadedly mounted in a member 97 fixed to plate 72. Rod 96 has a turning knob 98. The plate 72, as shown, has an opening 99 for easy access to the turning knob 98.

When the holder 70 is in place in the housing 25, as shown in FIGURE 5, the grid plate 15 carried thereby is in superimposed and substantially surface contact relation to the slide 13 carried by the holder 29. Means for retaining the holder 70 in generally operative position in the housing comprises a screw 100 having screw-threaded engagement with a lug 101 on the forward end portion of plate 72. The screw has a turning knob 102 fixed thereto and an axial bore 103. A rod 104 is reciprocally mounted in the bore. The rod has an annular shoulder 105 thereon disposed in a bore enlargement 106 in the knob 102. The shoulder 105 is spaced somewhat from the outer end of the rod whereby a portion of the rod projects outwardly from the end of the knob when the shoulder is seated on a cap portion 107 of the knob. A spring 108 in the bore enlargement 106 normally holds the shoulder 105 in engagement with cap 107, which thus defines the outermost position of the rod 104.

The rod 104 has an annular recess 109 therein adjacent its inner end. The inner end portion of the screw 100 extends through a hole 110 in a bracket 111 fixed to a frame member 112 and which in turn is fixed to the wall 19 of the casing. A plurality of balls 113 are each seated in an aperture 114 in the wall of screw 100. The balls 113 are in engagement with the rod 104 (FIGURE 9), which holds the balls in radially outward relation with respect to the screw 100. However, when the rod 104 is moved inwardly as a result of pressure on the outwardly projecting end portion thereof, the recess 109 will be moved into radial alignment with the balls which may then move into the recess and out of radially projecting relation with respect to the screw. An annular recess 115 in the wall of hole 110 receives the balls in the radially projecting position thereof.

It will be apparent that, when the holder 70 is placed in the housing and the end of screw 100 moves through the hole 110 (the balls 113 being in recess 109 and rod 104 released whereby it is being urged outwardly by spring 108), the balls 113 will enter recess 115 as soon as they are radially aligned therewith to indicate the operative position of the holder. The movement of the balls out of recess 109 results in outward movement of rod 104 under the influence of spring 108 to the position of FIGURE 9.

Longitudinal adjustment of the holder 70 in order to effect Y adjustment of the relative positions of the grid plate 15 and slide 13 is effected simply by turning the knob 102. Locking of the holder in adjusted position is provided by locknut 116.

It will be apparent that the adjustments described in order to place the grid and slide in minutely accurate relation to each other can only be effected if one has a clear view of the superimposed grid and slide. To this end, the invention provides means for continuously and clearly viewing the superimposed grid and slide during the adjustment steps.

This viewing means includes a lamp tray 117 slidably mounted in housing 25 on tracks 118 below the holders 29 and 70. A lamp 119 (which may be, for instance, a low power 100-watt projection lamp) is mounted in a bracket #120 on the tray. The lamp is located in a housing 121, in which is also mounted a reflector 122 and a conventional condenser lens assembly 123 to project the light beam upwardly through the slide and grid.

Since the invention contemplates that the lamp 119 will also provide the required lighting for the photographic reproduction, it is necessary that the intensity of the light provided by the lamp be closely controlled in order to achieve uniform background density within the range of governmental specifications. It is thus desirable in the practice of the invention, that the required light intensity for clear reproduction of each individual slide be established prior to the reproduction step. A conventional densitometer for measuring diffuse density calibrated for this particular purpose may be employed. Having ascertained such intensity for a particular slide, light intensity control mechanism, indicated generally at 124 and having a graduated control knob 125, is actuated to provide the required intensity of the lamp 119. As shown, the control knob 125 is mounted on the forward wall 126 of the tray. A suitable electrical control circuit (not shown) is provided to automatically set the intensity of the lamp at the desired degree just prior to the start of each photographic cycle.

Since it is also desirable that the light from lamp 119 be diffused during the photographic reproduction procedure, a glass diffusion panel 127 is slidably mounted in guides 128 located in the upper portion of the tray. A spring 129 connected to the panel and to the wall 126 normally holds the panel forwardly of the lamp housing 121 and out of overlying relation with the lamp 119. A flexible line 130 connects the panel through a frame 131 to a pulley 132, the shaft 133 of which is driven by a motor 134 mounted on the rearward end of the tray. The line 130 may be trained over an idler pulley 135. The motor 134 is adapted to be energized automatically by the electrical control circuit just prior to the start of each photographic cycle to pull the panel 127 into overlying relation with the lamp housing. On de-energization of the motor following the photographic steps, the spring 129 returns the panel 127 to its forward positions.

The image of the superimposed grid and slide is projected onto a screen 136 (which may be of ground glass type) mounted in a frame 137 which, as shown, is hingedly connected at 138 to the front wall 19 of the casing. The screen 136 is preferably disposed at an angle to the wall 19 for convenient viewing. For this purpose, an extension case 139 is fixed to the screen frame, the edges of such case being adapted to engage sealingly the front wall 19. The hinged connection of the screen permits swinging movement thereof for inspection of the adjacent interior of the casing 18.

The image is projected onto the screen by means of a lens assembly 140 mounted in a drum 141, a reflecting mirror 142 also mounted in the drum, and a reflecting mirror 143 mounted in the casing. It will be apparent that the angles of the reflecting surfaces of the mirrors 142 and 143 will be appropriately chosen to produce the image on the screen 136.

The drum 141 has an opening 144 in its bottom wall for passage of the light beam to the lens assembly 140, and an opening 145 in its side wall for passage of the reflected image from mirror 142 to mirror 143.

The drum 141 is revolvably mounted by means of an axial shaft 146 supported in fixed bearings 147 and driven as by means of a belt 148, pulley 149 and motor 150. Electrical control means (not shown) energizes the motor 150 just prior to the photographic step to rotate the drum through (for instance) a half revolution to move the projection lens assembly 140 and mirror 142 out of the axis of the camera lens system. In the latter position of the drum, the line of sight of the camera is uninterrupted by provision of vertically aligned openings 151 and 152 in the top and bottom walls of the drum. Light entering through opening 145 is blocked by a baffle 153 in the drum to prevent fogging of film insert during photography of BT record. Following the photographic procedure, the motor 150 is automatically actuated to return the drum to projection viewing position.

Operation of the machine will be generally apparent from the foregoing description but will now be briefly recapitulated. An appropriate grid plate 15 is placed in holder 70, which is then located in operative position in the housing 25. The BT slide is placed in holder 29 preferably after having determined, by means of a densitometer, the most effective light intensity setting for yielding a microfilm reproduction of controlled quality such as set forth in governmental specifications. The light intensity of lamp 119 (prior to the photographic cycle) is adjusted accordingly. The holder 29 is operatively located in housing 25.

Now, with lamp 119 energized and the image of the superimposed grid and slide projected onto the screen 136, the adjustment knob 93 is rotated to adjust finely the rotative position of the grid 16 relative to the trace on the slide 13; the adjustment knob 102 is actuated to adjust the position of grid 16 along the Y axis thereof; and the adjustment knob 49 is actuated to adjust the position of the BT slide along the X axis thereof.

When proper adjustments have been made, all adjustment knobs are locked by activating locking devices 59, 116 and 96, and the machine is placed in its photographic cycle which automatically adjusts the intensity of lamp 119 to the most effective degree, places the light diffusing panel 127 in the path of the light beam, and rotates drum 141 to place openings 151 and 152 thereof in line with the camera lens axis.

The BT record card thus produced has on its microfilm portion, a reproduction of the superimposed grid and slide, which reproduction, because of the quality control steps in part described, is highly accurate in minute detail and thus the results obtainable from such record cards are very valuable.

We claim:

1. A method of producing a bathythermograph record card having a microfilm portion which comprises superimposing a transparent plate having thereon a calibration grid on and in substantially surface contact relation with a transparent plate having a bathythermograph trace thereon, projecting an image of said trace with said grid superimposed thereon onto a screen, while viewing said image adjusting the position of said grid with respect to said trace by at least one of the steps consisting of rotatively adjusting one of said plates relative to the other, moving one of said plates relative to the other in a lateral direction, and moving one of said plates relative to the other in a direction normal to said lateral direction to position said grid and trace in accurate relation with respect to each other, and photographically reproducing said adjusted grid and trace into said microfilm portion of said card.

2. A method of producing a bathythermograph record card as defined in claim 1, wherein said image projecting step and said photographic reproduction step are conducted while maintaining said plates in the same location.

3. A method of producing a bathythermograph record card as defined in claim 1, wherein said image projecting step includes the step of projecting a light beam onto said superimposed plates, and wherein said photographic reproduction step includes the step of utilizing said light beam at a lower intensity than that employed in said image projecting step.

4. A method of producing a bathythermograph record card as defined in claim 3, including the step of predetermining the degree of said lower intensity.

5. A method of producing a bathythermograph record card having a microfilm negative portion which comprises superimposing a transparent plate having thereon a calibration grid on and in substantially surface contact relation with a transparent plate having a bathythermograph trace thereon, projecting an image of said trace with said grid superimposed thereon onto a screen while viewing said image, adjusting the position of said grid with respect to said trace by rotatively adjusting said grid plate relative to said trace plate, moving said grid plate in a lateral direction relative to said trace plate, and moving said trace plate relative to said grid plate in a direction normal to said lateral direction to position said grid and trace in accurate relation with respect to each other, and photographically reproducing said adjusted grid and trace onto said microfilm negative portion of said card.

6. A method of producing a bathythermograph record card having a microfilm positive portion which comprises superimposing a transparent plate having thereon a calibration grid on and in substantially surface contact relation with a transparent plate having a bathythermograph trace thereon, projecting an image of said trace with said grid superimposed thereon onto a screen, while viewing said image adjusting the position of said grid with respect to said trace by rotatively adjusting said grid plate relative to said trace plate, moving said grid plate in a lateral direction relative to said trace plate, and moving said trace plate relative to said grid plate in a direction normal to said lateral direction to position said grid and trace in accurate relation with respect to each other, and photographically reproducing said adjusted grid and trace onto said microfilm positive portion of said card.

7. In combination with a camera having a casing and a lens system therein having an axis and an image plane, apparatus for reproducing on the microfilm portion of a record card a bathythermograph trace with superimposed calibration grid which comprises a housing positioned in said casing, a calibration grid plate holder removably mounted in said housing and having an operative position therein, a bathythermograph trace-containing plate holder removably mounted in said housing and having an operative position therein in underlying relation to said first holder, a plate-receiving frame mounted in each said holder and located substantially in said image plane, means for adjusting the position of each said frame relatively to the other of said frames, a projection screen on said casing, and a projector having a projection path coinciding with said lens system axis and extending through said plate-receiving frames when in operative position to said screen.

8. In combination with a camera having a casing and a lens system therein having an axis and an image plane, apparatus for reproducing on the microfilm portion of a record card a bathythermograph trace with superimposed calibration grid which comprises a housing positioned in said casing, a calibration grid plate holder removably mounted in said housing and having an operative position therein, a bathythermograph trace-containing plate holder removably mounted in said housing and having an operative position therein in underlying relation to said first holder, a plate-receiving frame mounted in each said holder and located substantially in said image plane, plate clamping means carried by each said holder, one of said holders havings means for adjusting its position in one direction relatively to the other of said holders and means for rotating said plate-receiving frame therein, the other of said holders having means for adjusting the position of said plate-receiving frame therein in a direction normal to said first direction, a projection screen on said casing, and a projector having a projection path coinciding with said lens system axis and extending through said plate-receiving frame when in operative position to said screen.

9. Apparatus as defined in claim 8, wherein said plate-receiving frames, when in operative position, are in alignment with the axis of said lens system.

10. In combination with a camera having a casing and a lens system therein, apparatus for reproducing on the microfilm portion of a record card a bathythermograph trace with superimposed calibration grid which comprises a housing mounted in said casing, a calibration grid plate holder slidably mounted in said housing and having an operative position therein, a bathythermograph trace-containing plate holder slidably mounted in said housing and having an operative position therein in underlying relation to said first holder, a plate-receiving frame mounted in each said holder, means for adjusting the position of each said frame relatively to the other of said frames, a lamp tray in said housing underlying said holders, a projection lamp and condensing lens assembly mounted on said tray and having a light ray path extending through said frames in the operative position thereof, a rotatably mounted receptacle in said casing, a focussing lens and image ray reflector mounted in said receptacle, means for rotating said receptacle to a first position wherein said focussing lens and reflector overlie said light ray path and to a second position wherein said focussing lens and reflector are displaced from said light ray path, said light ray path coinciding with the axis of said camera lens system, said receptacle having aligned openings therein through which said light ray path extends in said second position thereof, and a screen mounted in said casing for reception of image rays from said reflector.

11. Apparatus for positioning a calibration grid on a trace-containing plate which comprises a housing, first and second plate holders removably mounted in said housing and each having an operative position therein, said first holder having a grid plate receiving frame therein, said second holder having a trace plate receiving frame therein, said frames being vertically aligned in the operative positions thereof, means for adjusting the position of each of said frames relative to the other of said frames, a projection screen, a projector having a projection path extending through said frames to said screen, said grid plate receiving frame comprising a disc rotatably mounted in said first holder, means for rotating said disc, means for restraining said disc against rotation, said disc having a plate-receiving opening therein, a plate clamping device mounted on said first holder and having a clamping member defining a portion of the wall of said opening, said first holder having sliding adjustable movement in a first direction in said housing, and means for locking said first holder against said sliding movement.

12. Apparatus as defined in claim 11, said trace plate receiving frame having a plate-receiving opening therein, a plate clamping device mounted on said second holder and having a clamping member defining a portion of the wall of said opening, said trace plate receiving frame being movable in said second holder in a direction normal to said first direction, means for moving said trace plate receiving frame in said second direction, and means for locking said trace plate receiving frame against movement.

13. Apparatus for positioning a calibration grid on a trace-containing plate which comprises a housing, first and second plate holders removably mounted in said housing and each having an operative position therein, said first holder having a grid plate receiving frame therein, said second holder having a trace plate receiving frame therein, said frames being vertically aligned in the operative positions thereof, means for adjusting the position of each of said frames relative to the other of said frames, a projection screen, a projector having a projection path extending through said frames to said screen, means carried by each said holder identifying said operative position, said second holder having side walls, said frame of said second holder having projecting pins, said side walls having slots receiving said pins, said frame of said second holder having an extent of perpendicular movement therein defined by said pins and slots, a spring in said second holder urging said frame thereof in one direction of said movement, said housing having a pair of flanges, each said flange having a notch therein for reception of one of said pins to define said position identifying means of said second holder.

14. Apparatus for positioning a calibration grid on a trace-containing plate comprising a housing, a grid plate receiving holder removably mounted in said housing and having a frame for receiving and holding a calibration grid, said grid plate holder having an operative position in said housing, means identifying the operative position of said grid plate holder, spaced tracks within said housing extending parallel to the operative position of said grid plate holder, a pair of flanges each mounted adjacent to and parallel one of said tracks and each having a pin receiving notch therein, a trace plate receiving holder having means engaging said tracks for removably mounting said trace plate holder within said housing adjacent said grid plate holder, said trace plate holder having side wall portions provided with slots, a frame for receiving and holding a trace plate having projecting pins each extending through a slot in said side wall portion, said frame of said trace plate holder having an extent of perpendicular movement defined by said pins and slots, a spring in said trace plate holder urging said frame in a first direction, said pins being so constructed and arranged to engage said flanges and move said frame of said trace plate holder in a second direction opposite said first direction while said trace plate holder is being moved along said tracks to depress the trace plate carried thereby and avoid scratching of the trace plate surface, said pins being received by said notches in the operative position of said trace plate holder permitting said trace plate to be carried towards said grid plate.

References Cited by the Examiner

UNITED STATES PATENTS

| | | | |
|---|---|---|---|
| 2,549,150 | 4/1951 | Willis | 346—107 X |
| 2,608,094 | 8/1952 | Best | 88—24 X |
| 2,746,833 | 5/1956 | Jackson | 346—107 |
| 2,774,443 | 5/1956 | Higonnet et al. | 88—24 |

NORTON ANSHER, *Primary Examiner.*

R. A. WINTERCORN, *Assistant Examiner.*